(12) United States Patent
Dickie et al.

(10) Patent No.: US 10,042,887 B2
(45) Date of Patent: Aug. 7, 2018

(54) QUERY OPTIMIZATION WITH ZONE MAP SELECTIVITY MODELING

(71) Applicant: International Business Machines Corporation, Armonk, NY (US)

(72) Inventors: Garth A. Dickie, Framingham, MA (US); Jay B. Wolf, Lakeville, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 725 days.

(21) Appl. No.: 14/562,325

(22) Filed: Dec. 5, 2014

(65) Prior Publication Data

US 2016/0162599 A1 Jun. 9, 2016

(51) Int. Cl.
*G06F 17/30* (2006.01)

(52) U.S. Cl.
CPC .. *G06F 17/30466* (2013.01); *G06F 17/30469* (2013.01); *G06F 17/30952* (2013.01); *G06F 17/30979* (2013.01)

(58) Field of Classification Search
None
See application file for complete search history.

(56) References Cited

U.S. PATENT DOCUMENTS

| | | | |
|---|---|---|---|
| 6,272,487 B1 * | 8/2001 | Beavin | G06F 17/30469 |
| 6,353,826 B1 * | 3/2002 | Seputis | G06F 17/30463 |
| 6,556,986 B2 | 4/2003 | Hara | |
| 6,973,452 B2 | 12/2005 | Metzger et al. | |
| 7,080,062 B1 * | 7/2006 | Leung | G06F 17/30463 |
| 7,152,060 B2 | 12/2006 | Borthwick et al. | |
| 7,251,663 B1 * | 7/2007 | Smith | G06F 12/10 |

(Continued)

FOREIGN PATENT DOCUMENTS

WO    WO2009072233    6/2009

OTHER PUBLICATIONS

IBM TDB (Dec. 2012). Estimating spread of data in database column based on customer's query execution using density function. IPCOM000224412D.

(Continued)

*Primary Examiner* — Mariela Reyes
*Assistant Examiner* — Edward Jacobs
(74) *Attorney, Agent, or Firm* — Robert Bunker; Edell, Shapiro & Finnan, LLC

(57) ABSTRACT

According to one embodiment of the present invention, a system for processes a query for accessing data within one or more database objects stores an element of a database object among a plurality of different storage regions. Each storage region is associated with first and second range values indicating a value range for element values within that storage region. The system examines the first and second range values for the storage regions of each database object element and determines an effectiveness value representing a degree of overlap between the storage regions of that database object element. The system determines a selectivity model for the storage regions for each database object utilizing the effectiveness value, determines a query plan based on the selectivity model, and executes the query plan. Embodiments of the present invention further include a method and computer program product for processing a query in substantially the same manners.

9 Claims, 2 Drawing Sheets

(56) References Cited

U.S. PATENT DOCUMENTS

| | | | |
|---|---|---|---|
| 7,415,573 B2 | 8/2008 | Murayama et al. | |
| 7,461,050 B2* | 12/2008 | Corvinelli | G06F 17/30536 |
| 7,484,068 B2 | 1/2009 | Hu | |
| 7,774,336 B2 | 8/2010 | Beyer et al. | |
| 7,958,113 B2* | 6/2011 | Fan | G06F 17/30469 |
| | | | 707/718 |
| 8,108,400 B2 | 1/2012 | Graefe | |
| 8,176,021 B2 | 5/2012 | Kodavalla | |
| 8,224,879 B2 | 7/2012 | Kuwahara | |
| 8,234,295 B2 | 7/2012 | Haas et al. | |
| 8,341,180 B1 | 12/2012 | Arumugam et al. | |
| 8,380,714 B2 | 2/2013 | Inagaki | |
| 8,572,068 B2 | 10/2013 | Graefe et al. | |
| 8,768,916 B1* | 7/2014 | Ghazal | G06F 17/30592 |
| | | | 707/719 |
| 8,879,550 B2* | 11/2014 | Anand | H04L 63/0227 |
| | | | 370/389 |
| 8,972,337 B1 | 3/2015 | Gupta | |
| 9,372,889 B1* | 6/2016 | Jakobsson | G06F 17/30463 |
| 9,514,187 B2 | 12/2016 | Ziauddin | |
| 2004/0039891 A1 | 2/2004 | Leung et al. | |
| 2005/0010564 A1* | 1/2005 | Metzger | G06F 17/30339 |
| 2005/0086257 A1* | 4/2005 | Wright | G06Q 10/10 |
| 2005/0187917 A1* | 8/2005 | Lawande | G06F 17/30306 |
| 2007/0113007 A1* | 5/2007 | Murayama | G06F 3/0608 |
| | | | 711/114 |
| 2008/0177777 A1 | 7/2008 | Osaki | |
| 2008/0215531 A1* | 9/2008 | Markl | G06F 17/30463 |
| 2008/0263001 A1* | 10/2008 | Lohman | G06F 17/30445 |
| 2009/0055352 A1* | 2/2009 | Corvinelli | G06F 17/30536 |
| 2009/0070313 A1* | 3/2009 | Beyer | G06F 17/30386 |
| 2009/0254522 A1* | 10/2009 | Chaudhuri | G06F 17/30306 |
| 2009/0299989 A1* | 12/2009 | Zhang | G06F 17/30433 |
| 2010/0114870 A1* | 5/2010 | Al-Omari | G06F 17/30433 |
| | | | 707/718 |
| 2010/0332457 A1* | 12/2010 | Graefe | G06F 17/30321 |
| | | | 707/673 |
| 2011/0029508 A1* | 2/2011 | Al-Omari | G06F 17/30433 |
| | | | 707/718 |
| 2011/0137895 A1 | 6/2011 | Petrou | |
| 2011/0307521 A1* | 12/2011 | Slezak | G06F 17/30595 |
| | | | 707/800 |
| 2012/0078904 A1* | 3/2012 | Agrawal | G06F 17/30321 |
| | | | 707/737 |
| 2012/0084287 A1* | 4/2012 | Lakshminarayan | G06F 17/30469 |
| | | | 707/737 |
| 2013/0073537 A1* | 3/2013 | Simon | G06F 17/30463 |
| | | | 707/714 |
| 2013/0144815 A1* | 6/2013 | Luo | G06N 99/005 |
| | | | 706/12 |
| 2013/0166557 A1* | 6/2013 | Fricke | G06F 17/30442 |
| | | | 707/737 |
| 2013/0185178 A1* | 7/2013 | Greef | G06Q 40/00 |
| | | | 705/30 |
| 2013/0198163 A1* | 8/2013 | Slezak | G06F 17/30595 |
| | | | 707/713 |
| 2013/0254212 A1* | 9/2013 | Rao | G06F 17/30625 |
| | | | 707/746 |
| 2013/0297587 A1 | 11/2013 | Singh et al. | |
| 2013/0301641 A1* | 11/2013 | Anand | H04L 63/0227 |
| | | | 370/389 |
| 2014/0095520 A1* | 4/2014 | Ziauddin | G06F 17/30492 |
| | | | 707/756 |
| 2015/0012544 A1* | 1/2015 | Nishimura | G06F 17/30333 |
| | | | 707/743 |
| 2015/0019529 A1* | 1/2015 | Veldhuizen | G06F 17/30469 |
| | | | 707/719 |
| 2015/0032684 A1* | 1/2015 | Gupta | G06F 17/30575 |
| | | | 707/600 |
| 2015/0095299 A1 | 4/2015 | Dickie et al. | |
| 2015/0095379 A1 | 4/2015 | Dickie et al. | |
| 2015/0286681 A1* | 10/2015 | Baer | G06F 17/30486 |
| | | | 707/754 |
| 2015/0286682 A1* | 10/2015 | Ziauddin | G06F 17/30486 |
| | | | 707/718 |
| 2015/0363404 A1 | 12/2015 | Dickie | |
| 2015/0363447 A1 | 12/2015 | Dickie | |
| 2016/0004727 A1 | 1/2016 | Tsuchida | |
| 2016/0162548 A1 | 6/2016 | Dickie et al. | |
| 2016/0314168 A1 | 10/2016 | Dickie et al. | |

OTHER PUBLICATIONS

IBM TDB (Feb. 1988). Access Path Selection in Relational Database Systems. IPCOM000056992D.

List of IBM Patents or Patent Applications Treated as Related, Mar. 9, 2016, 2 pages.

List of IBM Patents or Patent Applications Treated as Related, Dec. 10, 2014, 1 page.

Graefe, Goetz; "Fast Loads and Fast Queries", Hewlett-Packard Laboratories, Data Warehouse and Knowledge Discovery Lecture Notes in Computer Science, vol. 5691, 2009, pp. 111-124.

IP.com et al.; "Way of Improving Database Queries Performance by Automated Way of Creating Efficient Materialized Views (Containing Subset of the Columns)", IPCOM000227926D, May 29, 2013, pp. 1-5.

Baioco et al.; "An Effective Cost Model for Similarity Queries in Metric Spaces", ACM/SAC'07 Proceedings of the 2007 ACM Symposium on Applied Computing, Mar. 11-15, 2007, pp. 527-528.

List of IBM Patents or Patent Applications Treated as Related, Sep. 2, 2016, 2 pages.

* cited by examiner

QUERY OPTIMIZATION WITH ZONE MAP SELECTIVITY MODELING

BACKGROUND

Present invention embodiments relate to database technology, and more specifically, to improving query cost estimates by estimating zone map effectiveness.

In many data warehouse appliances, the hardware and software resources are balanced so that all components (e.g., storage, networking, CPU and accelerator resources) are busy when performing a large database table scan. The performance of such queries is improved not by optimizing any one component of the data path, but by identifying subsets of the rows with column values that do not need to be scanned. The "zone map" mechanism enables this optimization.

For queries that may make use of zone maps, query plan optimizers conventionally assign a cost for a table scan that assumes all pages of the table will be read. Alternatively, an optimizer may perform a "just in time statistics" scan, evaluating zone maps for a table to discover how many pages will remain in the scan list. However, for queries that end up having very high selectivity (i.e., few of the regions actually need to be scanned), a significant amount of time may be spent generating the "just in time statistics" compared to performing the query itself.

SUMMARY

According to one embodiment of the present invention, a system processes a query for accessing data within one or more database objects. An element of a database object is stored among a plurality of different storage regions. Each storage region is associated with first and second range values indicating a value range for element values within that storage region. The system examines the first and second range values for the storage regions of each database object element and determines an effectiveness value representing a degree of overlap between the storage regions of that database object element. The system determines a selectivity model for the storage regions for each database object element of the query utilizing the effectiveness value, determines a query plan for the query based on the selectivity model for one or more corresponding database object elements, and executes the query plan to access data from the database objects for the query. Embodiments of the present invention further include a method and computer program product for processing a query in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
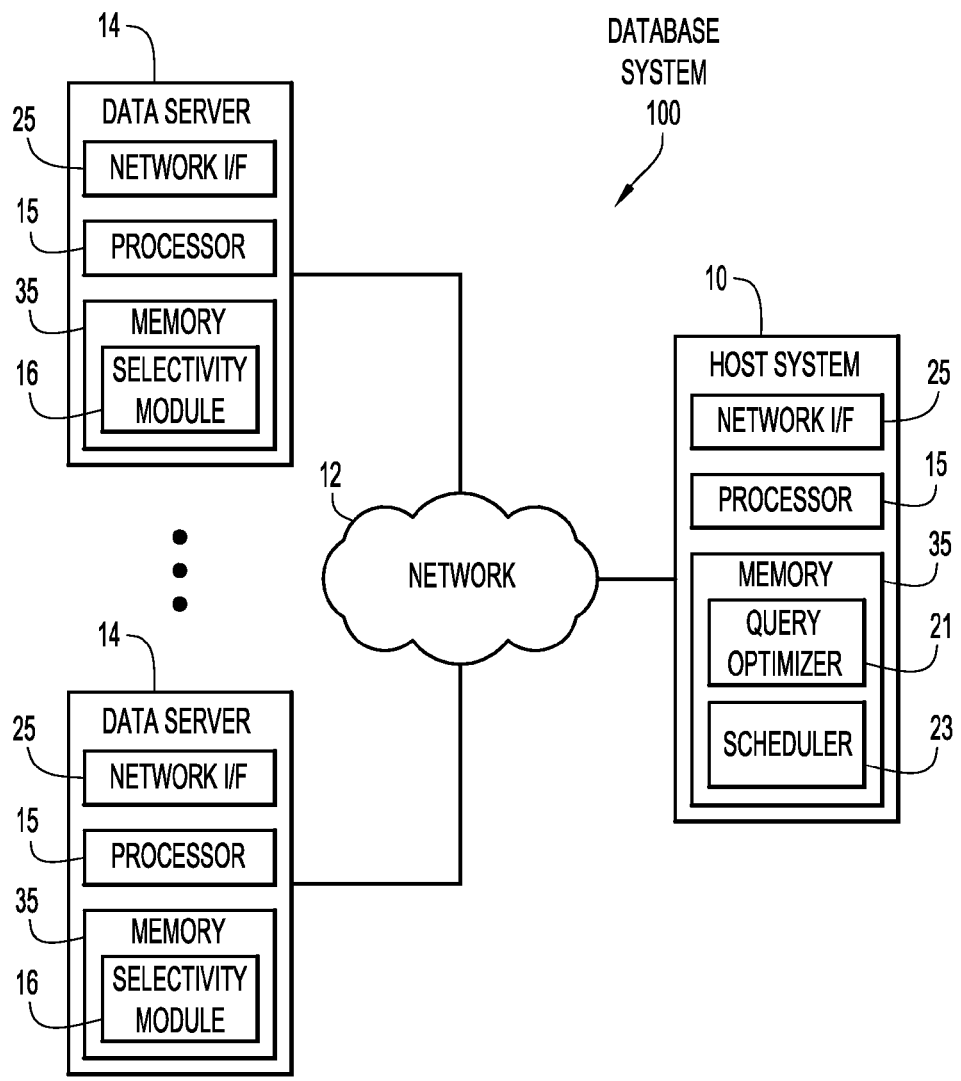
FIG. 1 is a diagrammatic illustration of an example environment for an embodiment of the present invention.

Present invention embodiments provide a query optimizer and/or scheduler with a measure of zone map effectiveness for elements (e.g., columns) of database objects (e.g., tables). Whereas other database statistics (e.g., most frequent values and equal height histograms) may be used to estimate the number of records that survive a filter, a present invention embodiment provides estimates of the number of pages that will need to be read in order to find those records. One aspect of a present invention embodiment is to improve query plan optimization. Another aspect is to improve the scheduling of query execution.

A database system may organize the rows of a table into groups of rows, which may be stored together in a corresponding region (zone) of a storage system. When database query evaluation requires scanning a large table, it is often beneficial to eliminate table rows from consideration early in processing, i.e., before much effort is devoted to processing those rows. Some database management systems (DBMSs) maintain zone maps which may be used to filter out rows of a table before actually reading the data stored in those rows.

A zone map is a collection of metadata for a database table. This metadata may include value ranges (sometimes referred to as a range map) that indicate minimum (min) and maximum (max) values for each column (col) of the table in each zone. Accordingly, the metadata may include value ranges of the form: col 1 {min value, max value}. For example, if a storage region is known to contain records with column values between 100 and 200 (i.e., col 1 {100, 200}), then a query restricted to records with column values greater than 500 will not read that storage region. However, if a query has a value from 100 to 200, including the values of 100 and 200, then that storage region may be read and searched. In this regard, a range map may identify upper and lower range values or bounds for data within a given storage region. The upper and lower bound may be conservative or inclusive of that bound. In one example, for a given storage region, values that are less than or equal to the upper bound (e.g., a max) in storage region's metadata, and greater than or equal to the lower bound (e.g., a min), may be found in that storage region.

Storage regions may be defined at more than one level of granularity. By way of example, a page of data may be 128 KB, while 24 pages or 3 MB (i.e., 128 KB×24 pages=3 MB) may be defined as an extent. A zone map for these regions may have a hierarchical structure that includes a range of values for both extents and pages, where a page range map describes a subset of the data described by an extent range map.

In general, zone maps are inexpensive to use and maintain, and can be maintained for all columns of a table. Thousands of records can be inserted into a table with only a few updates to the associated zone maps. For ordered or clustered data, zone maps provide good selectivity.

According to an embodiment of the present invention, a query plan optimizer and/or scheduler may be provided a simple (and therefore easy to utilize) measure of zone map effectiveness for every column of every table. The optimizer and/or scheduler may combine this measure with the number of zones in a table to estimate the number of pages that will be read if or when a query plan is executed.

An example environment for use with present invention embodiments is illustrated in FIG. 1. Specifically, database system 100 may include host system 10 and one or more data servers 14. Host systems 10 and data servers 14 may be remote from each other and communicate over a network 12. The network may be implemented by any number of any suitable communications media (e.g., wide area network (WAN), local area network (LAN), Internet, intranet, etc.). Alternatively, host systems 10 and data servers 14 may be local to each other, and communicate via any appropriate local communication medium (e.g., local area network (LAN), data center network, hardwire, wireless link, intranet, etc.). One or more clients or end user systems may be communicate with database system 100 via a network, data center network, or data center edge switch.

Host systems 10 and data servers 14 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., DBMS software, including software for maintaining zone maps; server/communications software; etc.). Data servers 14 may comprise compute and storage nodes or database engine blades (e.g., in a datacenter or server farm) for storing and accessing rows of at least one database table.

Data servers 14 may receive user query information related to desired database information from host systems 10. In another example, the information and queries may be received by the data servers, either directly or indirectly (e.g., from a client system). Host system 10 may include query plan optimizer 21 and query scheduler 23. Data server systems 14 may include selectivity module 16 to model the selectivity of one or more zone maps. The database system may store information for modeling zone map selectivity or their associated database storage regions (e.g., databases, range maps, etc.). The database system may be implemented by any conventional or other database or storage unit, may be local to or remote from host systems 10 and data servers 14, and may communicate via any appropriate communication medium (e.g., local area network (LAN), wide area network (WAN), Internet, hardwire, wireless link, intranet, etc.). Any clients, hosts, or data servers may present a graphical user interface (e.g., GUI, etc.) or other interface (e.g., command line prompts, menu screens, etc.) to solicit queries, information from users pertaining to modeling selectivity of zone maps for database storage regions, or other information and may provide results, which client, host, or data server may present via the display or a printer or may send to another device/system for presenting to the user.

Alternatively, one or more hosts 10 may operate as a stand-alone unit (i.e., without using data servers 14). In a stand-alone mode of operation, the host system stores or has access to the data (e.g., zone maps, databases, etc.), and includes selectivity module 16. The graphical user interface (e.g., GUI, etc.) or other interface (e.g., command line prompts, menu screens, etc.) solicits information from a corresponding user pertaining to merging of metadata, and may provide reports including merge results (e.g., metadata merge results, etc.). It should be understood that an end user or client system may operate in a stand-alone mode and include a database, DBMS, and selectivity module 16.

Selectivity module 16 may include one or more modules or units to perform the various functions of present invention embodiments described below. The various modules (e.g., selectivity module, optimizer, scheduler, etc.) may be implemented by any combination of any quantity of software and/or hardware modules or units, and may reside within memory 35 of the server and/or data servers for execution by processor 15.

Figure 2:
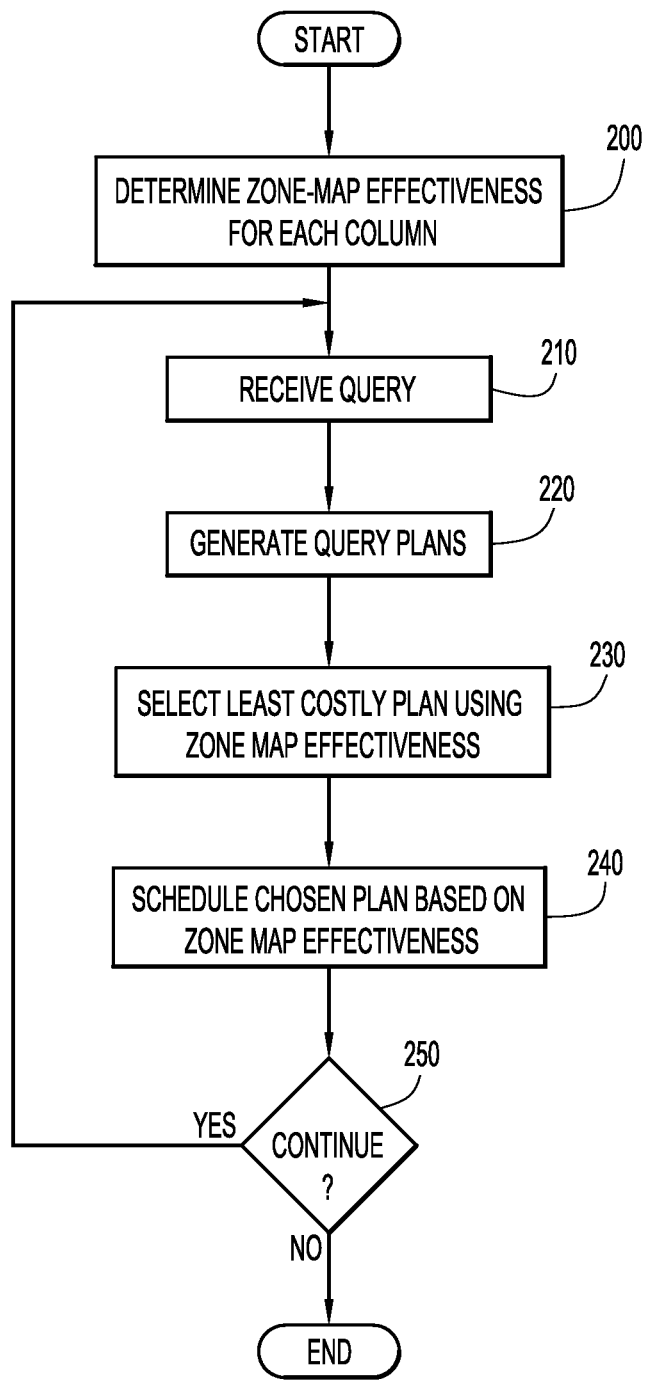
FIG. 2 is a flow diagram illustrating an example manner of processing database queries according to an embodiment of the present invention.

An example manner of processing database queries according to an embodiment of the present invention is illustrated in FIG. 2. Initially, at step 200, a database system that uses zone maps determines (e.g., via selectivity module 16) a measure of zone map effectiveness for each of one or more elements of one or database objects in a database. For example, a measure of zone map effectiveness may be determined for each column of each user table in the database. In one embodiment, a measure of zone map effectiveness is a value X between 0 and 1 representing the degree of overlap between zones, and may be regarded as an estimate of the expected fraction of zones which must be read for a point query, assuming that the point query key distribution is similar to the data distribution.

In a distributed database system, one or more data servers 14 may store rows of the same database table. In response to a query, each data server processes the query against its own portion of the data and returns the results to the host system. The host system merges the results from the data servers, and returns the merged results. Each data server 14 may maintain zone maps for its local zones, determine a measure of zone map effectiveness (e.g., X) for each column from its local zone maps, and provide these measures to the host system.

At step 210, the database system (e.g., host system 10) receives a query (e.g., from a client system via network 12). At step 220, the database system parses the query and generates a plurality of plans for executing the query.

At step 230, query plan optimizer 21 evaluates the cost (e.g., predicted running time) of each of the generated query plans, taking into account an effectiveness measure for each column accessed according to the plan, and selects the plan expected to have the least cost. The optimizer may combine the effectiveness measure for at least one column with the number of zones in the table to model zone map selectivity and estimate the number of pages which will be read for the query. For example, in the case of a point query, requesting a particular column value, the optimizer may multiply an effectiveness measure X by the number of pages for that column to estimate the number of pages that will be read. If the optimizer has column correlation statistics, then it can combine the X values for several columns involved in a query restriction to obtain an estimate of the amount of I/O resulting from a multi-column restriction. The optimizer may use this information to refine conventional predictions of query plan costs and select the least-cost plan without resorting to just-in-time statistical sampling.

Alternatively, the optimizer may determine whether to perform just-in-time statistical sampling based on the estimate of the number of pages that will be read. For example, if the number of pages expected to be read exceeds a predetermined threshold, such that the query will likely run for a long time compared to the time required for just-in-time sampling, the optimizer may elect to perform just-in-time sampling to improve the cost estimates for the query plans.

Selected plans for one or more queries may be pending concurrently. At step 240, scheduler 23 may determine an order in which the pending plans will execute based on zone map effectiveness. For example, the scheduler may use a conventional heuristic that tends to execute queries that will take a shorter amount of time before queries that will take longer to run. In predicting the amount of time a query will run, the scheduler may use the zone map effectiveness estimates to estimate the number of pages the query will read.

Processing may then return to step 210 to receive another query. Alternatively, processing may end (e.g., if the database system is shut down at step 250).

Accordingly, a present invention embodiment may make a significant improvement to query plans. For example, suppose that A and B both have large fact tables in the query select count(*) from A, B where A.c1=B.c1 and A.c2=3 and B.c3=10.

A correct selectivity model for the zone maps for A.c2=3 and for B.c3=10 will determine which side of the join requires a large amount of I/O, and hence the scan and join order. The optimizer may also obtain a model for the selectivity of A.c1 zone maps and B.c1 zone maps, which combine with the ability to use join conditions during zone map evaluation to determine which join order will make the most effective use of zone maps.

Another example of a two table join further illustrates manners in which use of the effectiveness measure may alter query plans for joins. Consider the query against a database of a company's product sales and returns:

| | |
|---|---|
| select | RETURNS.CUSTOMER_ID, |
| | RETURNS.SALES_DATE, |
| | RETURNS.RETURN_DATE, |
| | RETURNS.REASON |
| from | SALES,RETURNS |
| where | RETURNS.ORDER_ID = SALES.ORDER_ID |
| and | RETURNS.AMOUNT > 500000 |
| and | RETURNS.SALES_DATE BETWEEN '2013-07-01' and '2013-07-31' |
| and | RETURNS.RETURN_DATE BETWEEN '2013-07-01' and '2013-07-31' |
| and | SALES.SALES_DATE BETWEEN '2013-07-01' and '2013-07-31', |

In this example, ORDER_ID is a unique key in both the RETURNS tables and SALES table. In the SALES table, the values of the ORDER_ID column increase monotonically and are clustered together because they are generated as the rows for orders are created. As a result, the minimum and maximum ORDER_ID values in a page may be close together. Assuming a high enough rate of sales, each page may have one or two unique SALES_DATE entries since data would be inserted in SALES_DATE order.

With regard to the RETURNS table, consider that the company has a six month return policy. As a result, the sequential ORDER_ID values may be scattered, and a single page's minimum and maximum ORDER_ID could range over any value generated in the last six months. Assuming a high enough rate of returns, each page may have one or two unique RETURN_DATE entries, since data would be inserted in RETURN_DATE order.

Since the query joins on ORDER_ID, there is the question of which table will eliminate more pages from the other table: either the SALES table or the RETURNS table may be scanned first.

If the SALES table is scanned first, all ORDER_ID entries for purchases in July 2013 would be found. The filtered list of ORDER_ID values would then be provided to the zone map logic to eliminate pages from the RETURNS table. Because each page of the RETURNS table could have a six month ORDER_ID spread, the zone map may not effectively eliminate these pages. Many pages of the RETURNS table may have to be read. Many of the rows read from these pages might then be eliminated, since few of them may have matching ORDER_ID entries.

If the RETURNS table is scanned first, all those orders where the amount was greater than $50K and were purchased and returned in July 2013 will be found. The resultant list of ORDER_ID values would be friendly to the SALES.ORDER_ID zone maps as there is tight clustering around that data. This means fewer pages of the SALES table are read, which requires less disk access and less CPU usage to eliminate rows from the pages that don't match the set of RETURNS.ORDER_ID values.

In general, the optimizer tends to elect to move the least amount of data. There would naturally be more SALES records than RETURNS records, but the columns selected by the query are all from the RETURNS table. The fact that fewer pages of the SALES table would be scanned by scanning RETURNS affects the optimizer's determination of which table to move for the join.

An example of a three table join still further illustrates manners in which use of the effectiveness measure may alter query plans for joins. In this example, there is a CUSTOMER table and a REGION table in addition to the SALES table. The sales table has two foreign keys, REGION_ID and CUSTOMER_ID, and can join directly to either table. In addition, the CUSTOMER table also has a REGION_ID column. Assume that the SALES table is the largest table and should not be moved or materialized, and should instead be scanned in place and filtered via joins.

If the query filters on a specific region:
where REGION.REGION_CODE='Southeast'"
and a specific income range:
where CUSTOMER.INCOME between 130000 and 150000
there are two possibilities for the join. In the first scenario, scanning proceeds as follows: Scan the REGION table and restrict to "where REGION.REGION_CODE='Southeast'". Scan the CUSTOMER table restricted to "where CUSTOMER.INCOME between 130000 and 150000". And scan the SALES table, joining to the restricted REGION table and the restricted CUSTOMER table.

In the second scenario, scanning proceeds as follows: Scan the REGION table and restrict to "where REGION.REGION_CODE='Southeast'". Scan the CUSTOMER table, restrict to "where CUSTOMER_INCOME between 130000 and 150000", and join to the restricted REGION table. This will filter the customer table to only those CUSTOMER_ID values that exist in the "Southeast" region, and for which income is between $130K and $150K. Scan the SALES table joining to the restricted CUSTOMER table (via CUSTOMER_ID).

Assume that there are only 20 regions. Each page in the SALES table records the min/max REGION_ID (the zone maps) but there is a high probability that every page's min/max range will cover the REGION_ID represented by the "Southeast" region. This means that the first scenario will gain no zone map filtering advantage on REGION_ID and because the CUSTOMER table's income range will yield CUSTOMER_ID's throughout the entire data set.

On the other hand, there may be many (e.g., millions) of CUSTOMER_ID values and the min/max spread on CUSTOMER_ID may be narrower on every page. Depending on how many unique CUSTOMER_ID values satisfy region="Southeast" and income between $130K and $150K, there is a higher probability that a filtered CUSTOMER_ID list will reduce the number of pages read from the SALES table. The unique CUSTOMER_ID values will be compared to the SALES.CUSTOMER_ID min/max values for each page and it will determined whether the pages should be scanned or not. This will most likely result in the optimizer choosing the second scenario as the most optimal query plan because it reduces the number of pages read.

In all the scenarios above, the ability to interrogate the zone map information helps the optimizer better estimate the amount of pages needed to scan. This, in turn helps estimate the amount of time to scan the tables and execute the query. This provides better input to the scheduler in terms of expected run time for a query.

A manner of determining a measure X of zone map effectiveness for an element of a database object (e.g., a column of a table) is to analyze the maximum and minimum values of the column in each storage region to determine the extent to which the range of column values in each region overlap one another. Initially, a zone map is generated. In particular, the database or database tables may be subdivided into storage regions or zone (e.g., extents and pages of predetermined size). The size of the extents and pages may be chosen for optimization on a particular computing system (e.g., main frame, personal computer, cloud computing, etc.). Each storage region is associated with an interval including first and second interval values indicating a value range for values within that storage region (e.g., min and max values as described above). The zone map may be generated at any time and may be stored in the associated database (e.g., as a table).

To analyze the ranges for a column, the first and second interval values for the storage regions containing values of that column are sorted. The sorted first and second interval values are examined or traversed to identify overlapping storage regions and to produce a sum of overlapped storage regions. Consider the following examples of storage range values for a table that has been divided into various storage regions.

In a first example, a column is stored in three zones with range values of {1, 2}, {3, 4}, and {5, 6}. These values may have been rounded from real numbers to integers. In this example, none of the values in the three ranges overlap one another. As a result, few zones (specifically one zone) will have to actually be read to find all instances of a particular column value. In other words, the zone map is effective for that column.

In a second example, a column is stored in three zones with the range values of {1, 2}, {2, 3}, and {3, 4}. In this example, the amount of overlap is limited to the inclusive range values at the range endpoints. In a third example, a column is stored over four zones with the range values of {1, 10}, {1, 2}, {3, 4}, and {5, 6}. In these examples, two zones will be read to find a particular value.

In a fourth example, a column has range values of: {0, 10}, {1, 11}, {2, 9}, and {3, 13}. In this example, many or all of the zones may have to be read.

To quantify the degree of overlap between ranges, the effectiveness module may sort the min and max values for the ranges (this sorting may be performed for any of the examples presented herein) and annotate each value as a min or max value. By way of example, the range values of the fourth example, {0, 10}, {1, 11}, {2, 9}, and {3, 13}, are sorted and may be represented as [0, 1, 2, 3, 9, 10, 11, 13]. When annotated, the sorted values may be stored in table form:

| Type  | min | Min | min | min | max | max | max | max |
|-------|-----|-----|-----|-----|-----|-----|-----|-----|
| Value | 0   | 1   | 2   | 3   | 9   | 10  | 11  | 13  |

When a minimum value in one range map equals a maximum value in another range map, by convention, the min value may be ranked lower than an equivalent max value when sorted. As the min/max data is examined or traversed, a rolling and accumulated count may be maintained that indicates a difference in quantity between traversed min values (e.g., first interval values in a range map) and traversed max values (e.g., second interval values in a range map) to obtain an overall sum that indicates a relative level of overlap among ranges associated with a storage region. The accumulated count is the integral of the rolling count (i.e., an integral value). For example, the table shown above is updated below to illustrate the rolling and accumulated (total) counts:

| | col # | | | | | | | |
|---|---|---|---|---|---|---|---|---|
| | 1 | 2 | 3 | 4 | 5 | 6 | 7 | 8 |
| Type | min | Min | min | min | max | max | max | max |
| Sorted values | 0 | 1 | 2 | 3 | 9 | 10 | 11 | 13 |
| Rolling count | 1 | 2 | 3 | 4 | 3 | 2 | 1 | 0 |
| Total count | 1 | 3 | 6 | 10 | 13 | 15 | 16 | 16 |

In the above table, starting at column 1, the rolling count starts at 1 and indicates the number of mins encountered relative to the number of maxes. Since the first value is always a min, the rolling count always starts at 1 and the corresponding total cumulative count is also 1. Moving next to column 2, a min is also next encountered and the rolling count is advanced to 2 (i.e., 2 minimums and no maximums encountered). The rolling count of 2 is added to the total count of 1 to produce a total count of 3. Column 3 is also a min and the rolling count is advanced to 3 (i.e., 3 minimums and no maximums encountered). The rolling count of 3 is added to the total count of 3 to produce a total count of 6. By column 5, a first max is encountered and the rolling count is reduced from 4 to 3, while the total count is advanced from 10 to 13. The process continues and the final total cumulative count is 16.

A count of 16 is the maximum count that may be obtained for four zones. Consider the above example when extended to N intervals and their associated storage regions. If there are N {min, max} intervals, then there are 2N interval endpoints (i.e., N minimum values plus N maximum values). These endpoints are sorted as described above. The sorted list of endpoints is examined or traversed, tracking how many more mins than maxes have been encountered or observed. The current overlap value indicates a quantity of first interval values (e.g., a number of mins) that are stacked up against a quantity of second interval value (e.g., maxes) that have been encountered at a given point in the traversal. At each step in the traversal, the current overlap is accumulated into a sum. At the end of the traversal, an accumulated sum S representing the degree of overlap is obtained. The maximum value for S is N×N (e.g., 4×4=16, as determined in the example above).

The sum S may be divided by N×N to get a decimal or fractional value in the range zero to one representing an estimate of the zone map effectiveness for a column. That is, the effectiveness estimate may be given by $X=S/(N \times N)$.

The above procedure, or parts thereof, may also be reiterated when new and/or newly updated data are added to the system.

This calculation of X may be implemented in software code or hardware logic. The algorithm runs in an N×log (N) processing time (e.g., as used for sorting the minimum and maximum range values). When the intervals are non-overlapping, then the integral (total count) has value of N, resulting in $X=N/(N \times N)$, and indicating that few zones will actually have to be read. When the intervals overlap only at their boundaries, then the sum (total count) S has value 3N−2, which may indicate that the zone map is relatively efficient for N large compared to 1 or relatively inefficient for small N. If all of the intervals overlap then the S has value N×N and X=1, indicating that the zone map will provide little or no benefit.

It will be appreciated that the embodiments described above and illustrated in the drawings represent only a few of the many ways of implementing embodiments for estimating zone map effectiveness.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for processing a query for accessing data within one or more database objects, wherein a database object element is stored among a plurality of different storage regions with each storage region being associated with a first range value and a second range value indicating a value range for element values within that storage region, the system comprising:
at least one processor configured to:
determine a zone map effectiveness value representing a degree of overlap between the storage regions of each database object element by examining the first range value and the second range value for the storage regions of that database object element, the at least one processor being configured to determine the zone map effectiveness value for each respective database object element by:
sorting the first range values and the second range values for storage regions of the respective database object element, the first range values being minimum values for respective storage regions and the second range values being maximum values for the respective storage regions,
for each respective sorted value of the first range values and the second range values, determining a respective rolling count, the rolling count being incremented for each minimum value encountered and being decremented for each maximum value encountered,
adding each of the respective rolling counts to produce an accumulated sum, and
producing the zone map effectiveness value based on the accumulated sum and a number of respective storage regions for the respective database object element;
determine a zone map selectivity model for the storage regions for each database object element of the query utilizing the zone map effectiveness value of the each database object element of the query and a total quantity of the storage regions for the each database object element to model zone map selectivity and multiplying the zone map effectiveness value of each individual respective database object element of the each database object element of the query by the total quantity of the corresponding storage regions for the each individual respective database object element to produce an estimate of a quantity of storage regions to be read when performing a second query regarding the each individual respective database object;
determine an order for executing a plurality of query plans for the query based on the determined zone map selectivity model for the each database object element of the query, the determined order for executing the plurality of query plans having a lowest expected cost among all possible orders for executing the plurality of query plans; and
execute the plurality of query plans in the determined order to access data from the database object elements for the query.

2. The system of claim 1, wherein the zone map effectiveness value for each database object element is in a value range between zero and one.

3. The system of claim 1, wherein each database object includes a database table, and the database object element includes a database table column.

4. The system of claim 3, wherein the query includes a restriction on plural database table columns and determining the zone map selectivity model further comprises:
combining the zone map effectiveness values for the database table columns of the restriction with column correlation statistics to determine an amount of input/output operations for the restriction on the plural database table columns.

5. The system of claim 1, wherein the determined order for executing the plurality of query plans indicates at least one of a scan order and a join order for the database objects based on the zone map selectivity model of the corresponding database object elements.

6. A computer program product for processing a query for accessing data within one or more database objects, wherein a database object element is stored among a plurality of different storage regions with each storage region being associated with a first range value and a second range value indicating a value range for element values within that storage region, the computer program product comprising:
a computer readable storage medium having computer readable program code embodied therewith for execution on a processing system, the computer readable program code comprising computer readable program code configured to:
determine a zone map effectiveness value representing a degree of overlap between the storage regions of each database object element by examining the first range value and the second range value for the storage regions of that database object element, the computer readable program code being further configured to determine the zone map effectiveness value for each respective database object element by:
sorting the first range values and the second range values for storage regions of the respective database object element, the first range values being minimum values for respective storage regions and the second range values being maximum values for the respective storage regions,
for each of respective sorted value of the first range values and the second range values, determining a respective rolling count, the rolling count being incremented for each minimum value encountered and being decremented for each maximum value encountered,
adding each of the respective rolling counts to produce an accumulated sum, and
producing the zone map effectiveness value based on the accumulated sum and a number of respective storage regions for the respective database object element;
determine a zone map selectivity model for the storage regions for each database object element of the query utilizing the zone map effectiveness value of the each database object element of the query and a total quantity of the storage regions for the each database object element and multiplying the zone map effectiveness value of each individual respective database object element of the each database object element of the query by the total quantity of the corresponding storage regions for the each individual respective database object element to produce an estimate of a quantity of storage regions to be read when performing a second query regarding the each individual respective database object;
determine an order for executing a plurality of query plans for the query based on the determined zone map selectivity model for the each database object element of the query, the determined order for executing the plurality of query plans having a lowest expected cost among all possible orders for executing the plurality of query plans; and execute the plurality of query plans in the determined order to access data from the database object elements for the query.

7. The computer program product of claim 6, wherein the zone map effectiveness value for each database object element is in a value range between zero and one.

8. The computer program product of claim 6, wherein each database object includes a database table, and the database object element includes a database table column.

9. The computer program product of claim 8, wherein the query includes a restriction on plural database table columns and determining the zone map selectivity model further comprises:

combining the zone map effectiveness values for the database table columns of the restriction with column correlation statistics to determine an amount of input/output operations for the restriction on the plural database table columns.

\* \* \* \* \*